US006666378B2

(12) United States Patent
Dávila et al.

(10) Patent No.: US 6,666,378 B2
(45) Date of Patent: Dec. 23, 2003

(54) MULTIMEDIA GIFT CARD

(76) Inventors: Milton Dávila, 320 Plaza Real #310, Boca Raton, FL (US) 33432; James Brian Sanders, 26 Woodland Dr., Amherst, NH (US) 03031; Charles Dembisky, 34 Woodland Dr., Amherst, NH (US) 03031

( * ) Notice: Subject to any disclaimer, the term of this patent is extended or adjusted under 35 U.S.C. 154(b) by 0 days.

(21) Appl. No.: 10/056,739

(22) Filed: Jan. 25, 2002

(65) Prior Publication Data

US 2003/0141371 A1 Jul. 31, 2003

(51) Int. Cl.[7] .............................................. G06K 19/00
(52) U.S. Cl. ...................... 235/487; 235/381; 235/380
(58) Field of Search ................. 235/487, 381, 235/380

(56) References Cited

U.S. PATENT DOCUMENTS

| | | | | |
|---|---|---|---|---|
| 5,685,424 A | * | 11/1997 | Rozek et al. | 206/308.1 |
| 5,697,496 A | * | 12/1997 | Bauer | 206/308.1 |
| 5,775,491 A | * | 7/1998 | Taniyama | 206/308.1 |
| 5,915,734 A | * | 6/1999 | Minehart | 283/117 |
| 6,003,254 A | * | 12/1999 | Lorber | 40/124.06 |
| 6,035,280 A | * | 3/2000 | Christensen | 705/14 |
| 6,328,160 B1 | * | 12/2001 | Cooksey | 206/308.1 |
| 6,349,829 B1 | * | 2/2002 | Matheis et al. | 206/449 |
| 6,453,300 B2 | * | 9/2002 | Simpson | 705/26 |
| 6,457,581 B1 | * | 10/2002 | Lesovoy | 206/308.1 |
| 6,491,160 B2 | * | 12/2002 | Butler et al. | 206/232 |
| 6,493,970 B1 | * | 12/2002 | McCarthy et al. | 40/124.01 |
| 6,505,737 B1 | * | 1/2003 | Sherman | 206/308.1 |
| 6,510,124 B1 | * | 1/2003 | Wood | 369/273 |

* cited by examiner

Primary Examiner—Michael G. Lee
Assistant Examiner—Allyson Sanders

(57) ABSTRACT

A promotional tool and a vehicle used to distribute products, information, gift certificates, pre-paid phone cards, and coupons for businesses, corporations, retail establishments, universities, and sales personnel. A customized gift card displays professionally created artwork, logos and graphics that best portray the provider's intent for the overall design. The card is folded, die-cut and glued to receive a multimedia disc, gift certificate, coupon or phone card. A Multimedia Disc is included as a gift with each card. It is a digital medium that contains professionally recorded digital music and a variety of audio, video, and graphic information regarding the provider. It is placed in the card so the label which supports the card's overall design, is in view. A gift certificate, coupon, or a prepaid phone card can be placed in the card for easy accessibility and scanning by a retailer.

1 Claim, 6 Drawing Sheets

FIGURE 10    Gift certificate is conceiled when the gift card is closed    FIGURE 10a

Tri-Fold Design
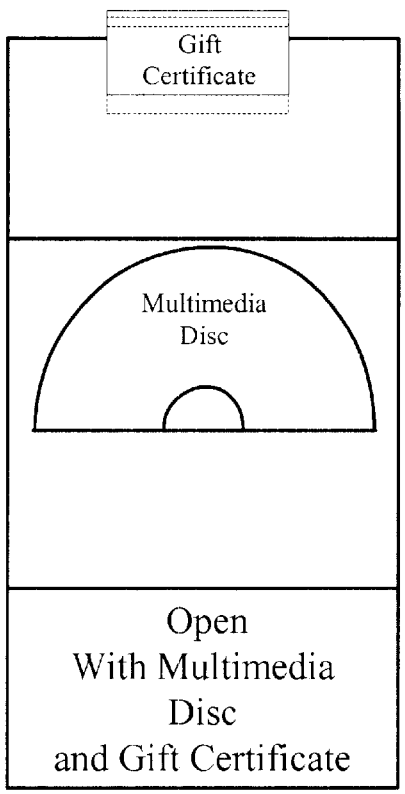
FIGURE 12
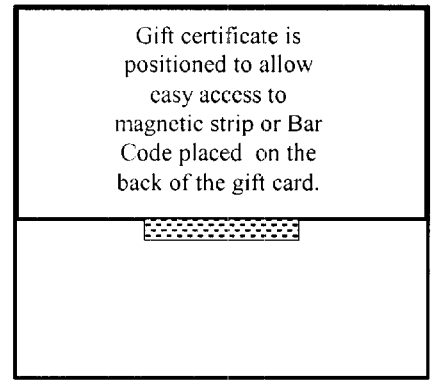
FIGURE 12a
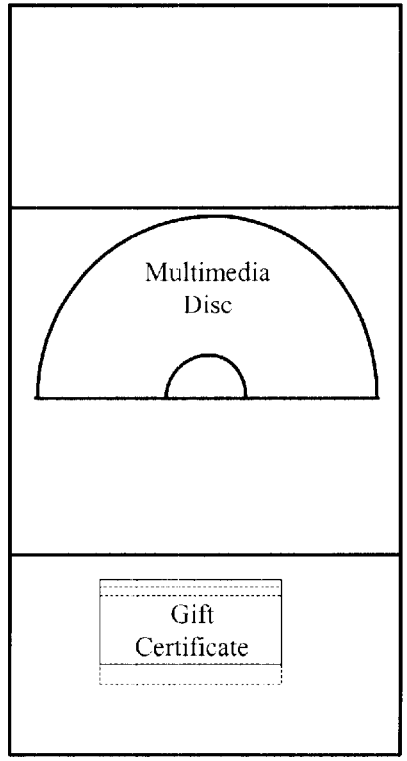
FIGURE 13
Gift certificate is conceiled when the gift card is closed
FIGURE 13a Multi-Fold Closed With Multimedia Disc and Gift Certificate

MULTIMEDIA GIFT CARD

CROSS-REFERENCE TO RELATED APPLICATIONS

Not Applicable.

STATEMENT REGARDING FEDERALLY SPONSORED RESEARCH OF DEVELOPMENT

Not Applicable.

REFERENCE TO A "SEQUENCE LISTING," A TABLE, OR A COMPUTER PROGRAM LISTING APPENDIX SUBMITTED ON A COMPACT DISC.

Not Applicable.

BACKGROUND OF INVENTION (1) Field of Invention

The field of art for which the Multimedia Gift Card pertains to is gift card, multimedia/music compact disc, gift certificates and promotional material.

(2) Description of Prior Art

Music recorded on all types of medium has been sold and given as gifts for many years.

Seasonal and non-seasonal gift cards have also been a primary means to express sentiment and celebrate a multitude of events.

Corporations and businesses have often given small gifts to employees, sales staff and customers which include pens, cups, glasses, bumper stickers, hats, and shirts, usually displaying the company colors, logos, and information. All of these items, when given, are perceived as gifts to the receiver, however; also have immense promotional value for the provider.

Retailers often provide gift certificates for purchase that are usually in the form of a plastic credit card. These gift certificates are usually not packaged to be given as a gift. Most gift cards hang from a piece of cardboard on a display rack previously sold with a single piece of cardboard which sometimes could be folded into a simple card. Retailers relied on displaying individual gift certificates from a single piece of cardboard, paper or plastic. The purchaser in most cases would have to purchase an additional card to send or give the certificate, coupon or prepaid phone card as a gift.

The advent and mass production of the personal computer, reduction in system cost, and increased popularity and accessibility to the internet, has enabled most consumers to own or have access to a computer. The exponential growth and availability of digital quality audio, video and graphics accompanied by the many compression formats and increased storage capacity of digital medium has provided a unique and diverse avenue for promotion by corporations, business, brokers, retailers, and universities.

BRIEF SUMMARY OF THE INVENTION

The multimedia gift card consists of three major components. A customized gift card, a disc, or other form of digital medium will be used, but is not limited to, hold digital quality music and graphics, and a gift certificate or a prepaid phone card.

The gift card is uniquely designed and customized to represent the corporation, business, brokerage firms, retailers or universities for which the gift card is made. The multimedia disc is included as a gift that displays a label which supports or matches the cards overall theme or design. The multimedia disc contains, but is not limited to, professionally recorded digital music, computer generated multimedia presentations, video presentations, company information and printable coupons. Die-cuts are made in the card to receive the multimedia disc, prepaid phone card or gift certificate.

The multimedia gift card is designed for corporations to present a personalized gift to employees, sales personnel and business associates. This invention combines conventional marketing technology, computer generated graphics and digital audio and video to create a total gift package.

The multimedia gift card provides retailers a creative, unique and personal packaging for their gift certificates, prepaid phone cards and products. The outstanding digital music, which is included as a special gift, will provide many years of listening enjoyment while the disc label information provides a lasting reminder of the multimedia discs origin. This invention will create a memorable tie to the provider that will ultimately create a favorable and lasting emotional bond with the receiver. This invention combines marketing, promotion, and entertainment to create an invaluable promotional tool as well as a vehicle to distribute products and information.

BRIEF DESCRIPTION OF THE SEVERAL VIEWS OF THE DRAWINGS

The drawings include bi-fold, tri-fold and multi-fold Multimedia Gift Cards of various shapes, sizes, folds and design characteristics. Some cards exhibits die-cuts to receive a Multimedia Disc and gift certificate.

FIG. 10: Displays an example of a Side Folding Bi-Fold card design that is open with a Multimedia Disc and a Gift Certificate. The gift certificate is concealed when the gift card is closed.

FIG. 10a: Displays an example of a Side Folding Bi-Fold card design that is closed. The gift certificate is concealed when the gift card is closed.

FIG. 12: Displays an example of a Tri-Fold card design that is open with a Multimedia Disc and a gift certificate. The gift certificate is positioned to allow easy access to the magnetic strip or bar code that is placed on the back of the gift card.

FIG. 12a: Displays an example of a Tri-Fold card design that is closed with a Multimedia Disc and a gift certificate. The gift certificate is positioned to allow easy access to the magnetic strip or bar code that is placed on the back of the gift card. This will allow easy access for retail sale.

FIG. 13: Displays an example of a Tri-Fold card design that is open with a Multimedia Disc and a gift certificate. The gift certificate is concealed when the gift card is closed.

FIG. 13a: Displays an example of a Tri-Fold card design that is closed with a Multimedia Disc and a gift certificate. The gift certificate is concealed when the gift card is closed.

DETAILED DESCRIPTION OF THE INVENTION

Figure 1:
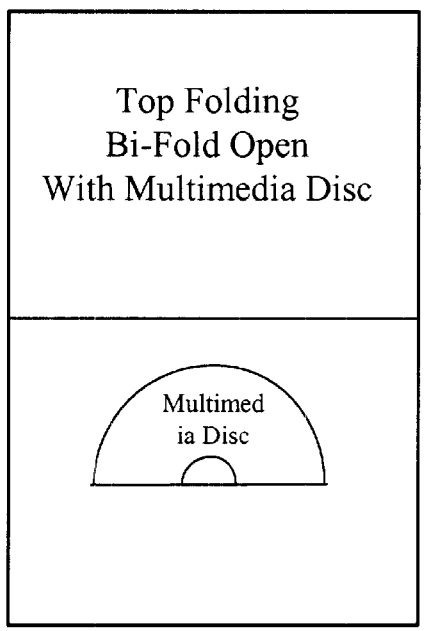
FIG. 1: Displays an example of a Top Folding Bi-Fold card design that is open with a Multimedia Disc.
Figure 1A:
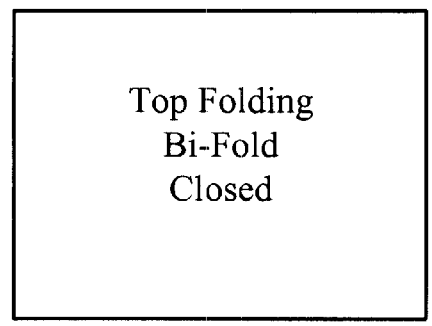
FIG. 1a: Displays an example of a Top Folding Bi-Fold card design that is closed.
Figure 2:
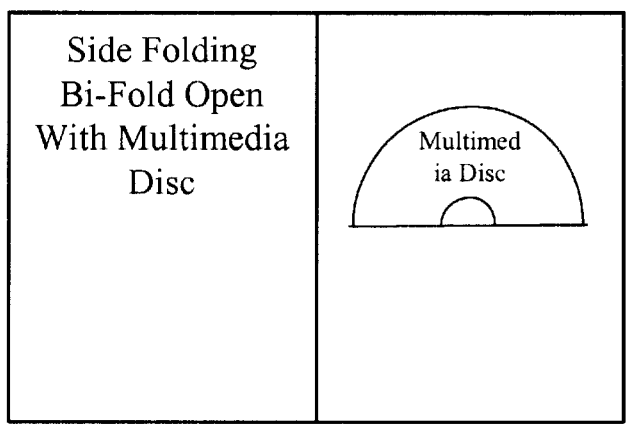
FIG. 2: Displays an example of a Side Folding Bi-Fold card that is open with a Multimedia Disc.
Figure 3:
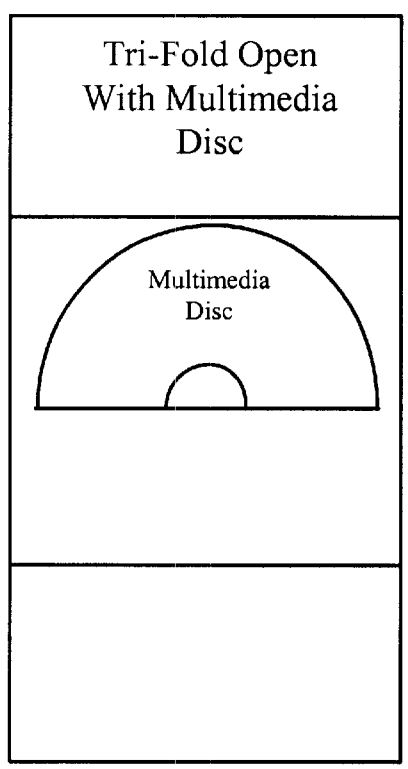
FIG. 3: Displays an example of a a Tri-Fold card design that is open with a Multimedia Disc.
Figure 2A:
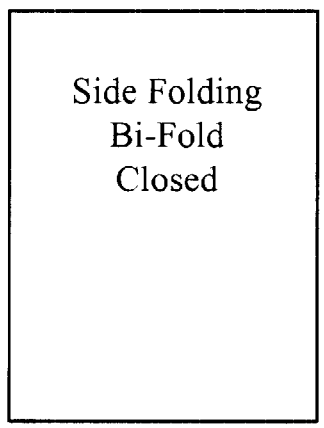
FIG. 2a: Displays an example of a Side Folding Bi-Fold card that is closed with a Multimedia Disc.
Figure 3A:
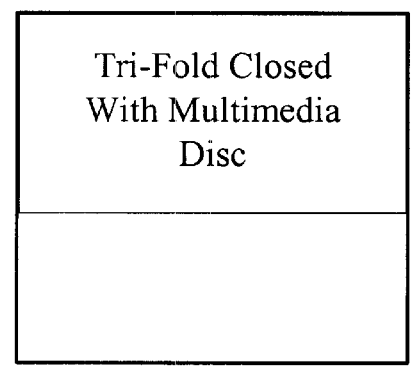
FIG. 3a: Displays an example of a Tri-Fold card design that is closed with a Multimedia Disc.
Figure 4:
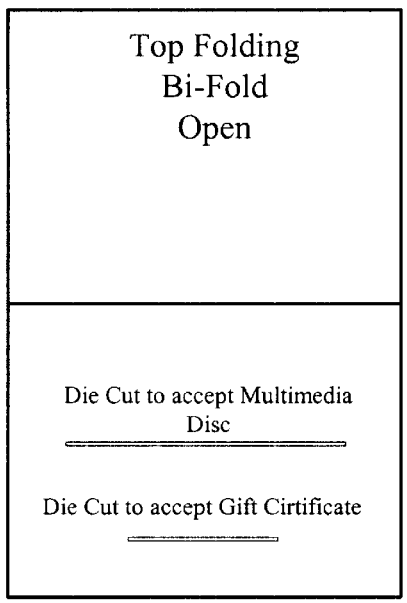
FIG. 4: Displays an example of a Top Folding Bi-Fold card design that is open showing the die-cuts that receives a Multimedia Disc and a gift certificate.
Figure 5:
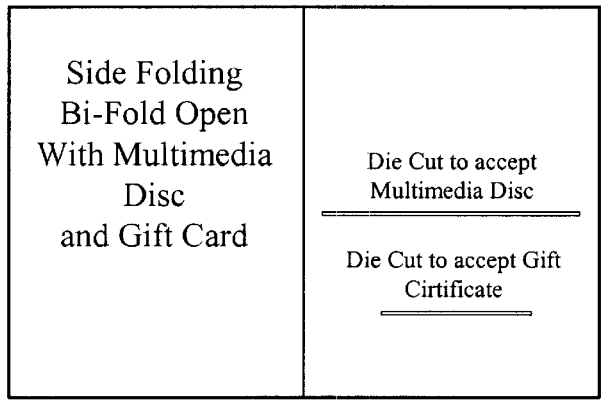
FIG. 5: Displays an example of a Side Folding Bi-Fold card design that is open showing the die-cuts that receives a Multimedia Disc and a gift certificate.
Figure 6:
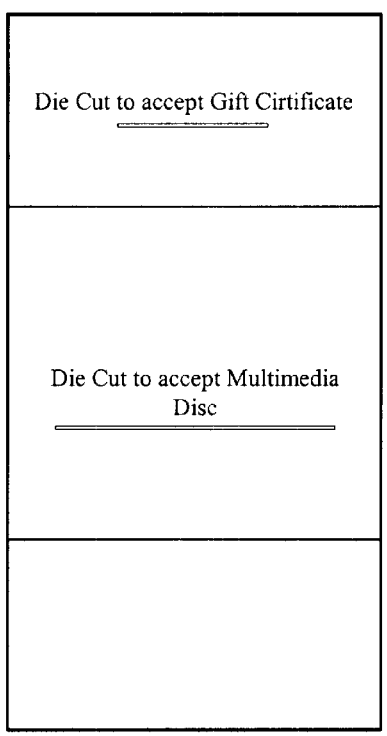
FIG. 6: Displays an example of a Tri-Fold card design showing the die-cuts that receives a Multimedia Disc and a gift certificate.
Figure 7:
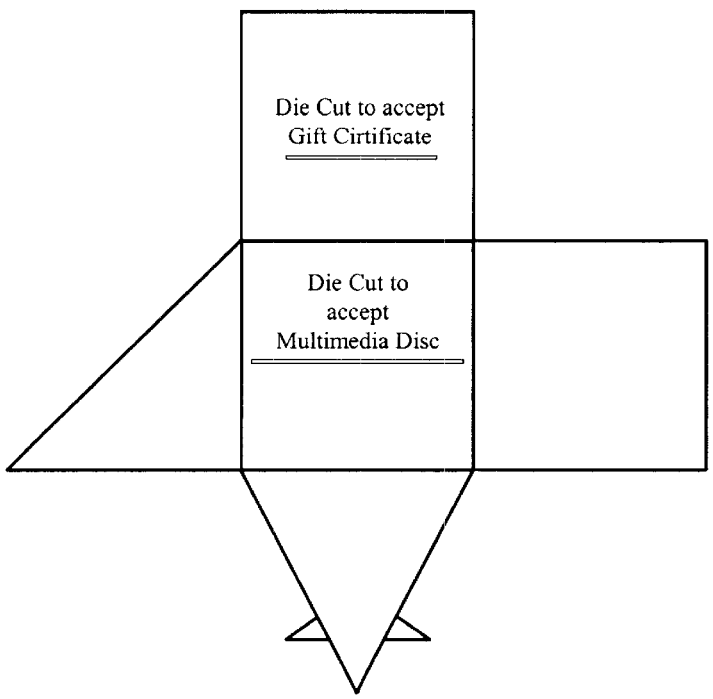
FIG. 7: Displays an example of a Multi-Fold card design showing the die-cuts that receives a Multimedia Disc and a gift certificate.
Figures 8, 8A, 8B:
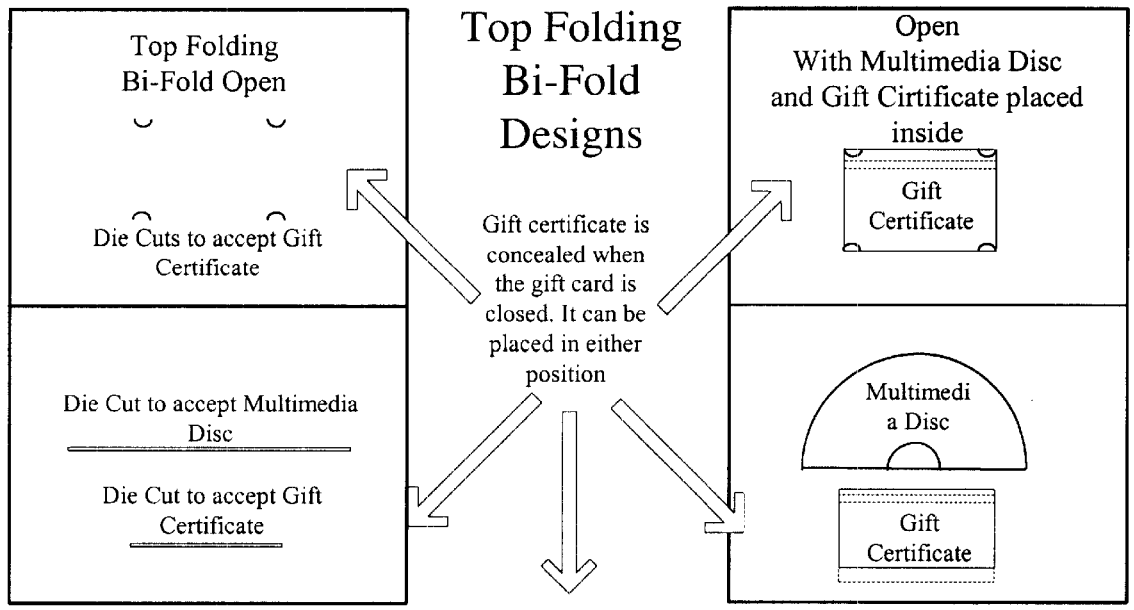
FIG. 8: Displays an example of a Top Folding Bi-Fold card design showing the die-cuts that can receive a Multimedia Disc and gift certificate. The gift certificate is concealed when the gift card is closed. The gift certificate can be placed in either position, at the bottom or top of the card, depending on the overall card design.
FIG. 8a: Displays an example of a Top Folding Bi-Fold card design that is open with a Multimedia Disc and Gift Certificate placed inside. The gift certificate is concealed when the gift card is closed. The gift certificate can be placed in either position, at the bottom or top of the card, depending of the overall card design.
FIG. 8b: Displays an example of a Top Folding Bi-Fold card design that is closed.
Figures 9, 9A:
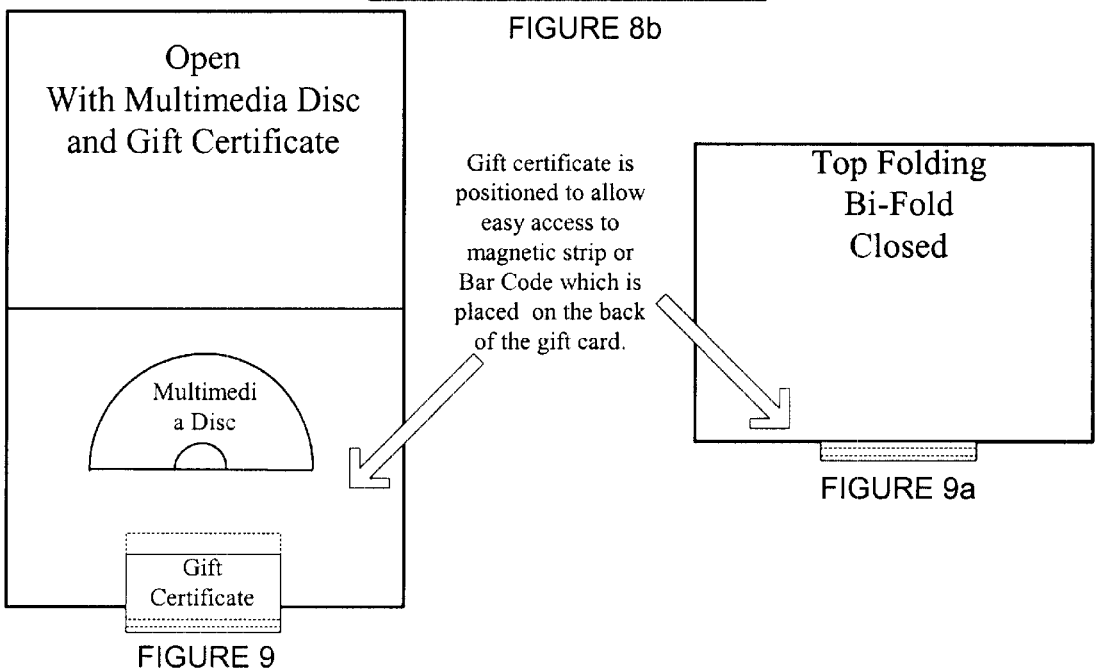
FIG. 9: Displays an example of a Top Folding Bi-Fold card design that is open with a Multimedia Disc and a gift certificate. The gift certificate is positioned to allow easy access to the magnetic strip or Bar Code that is placed on the back of the gift card. This will allow easy access for retail sale.
FIG. 9a: Displays an example of a Top Folding Bi-Fold card design that is closed. The gift certificate is positioned to allow easy access to the magnetic strip or bar code that is placed on the back of the gift card. This will allow easy access for retail sale.
Figure 11:
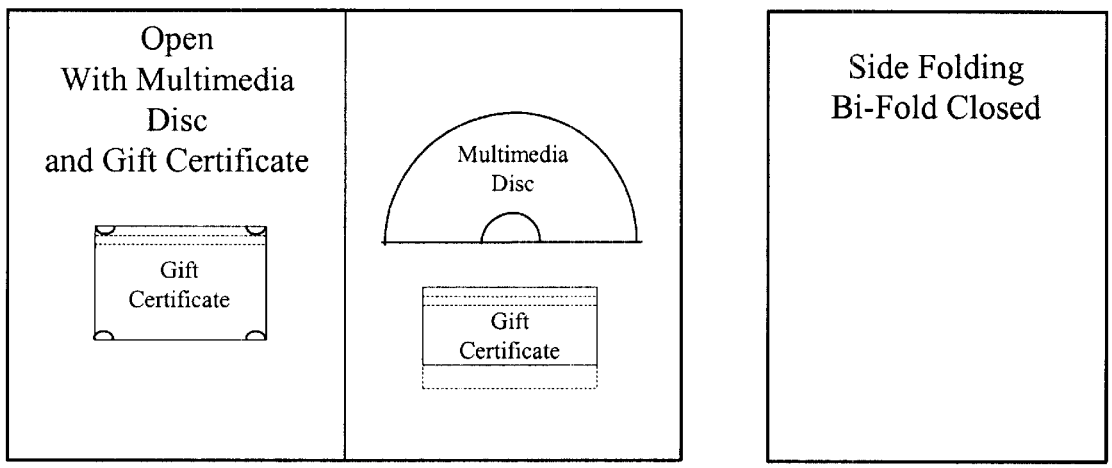
FIG. 11: Displays an example of a Side Folding Bi-Fold card design that is open with a Multimedia Disc and a gift certificate. The gift certificate is positioned to allow easy access to the magnetic strip or bar code that is placed on the back of the gift card.
Figure 11A:
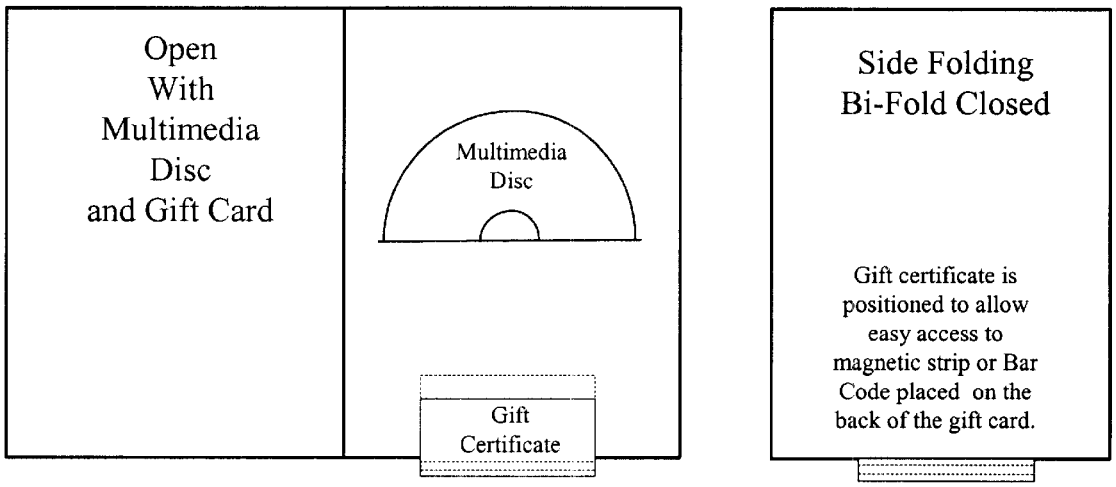
FIG. 11a: Displays an example of a Side Folding Bi-Fold card design that is closed. The gift certificate is positioned to allow easy access to the magnetic strip or bar code that is placed on the back of the gift card. This will allow easy access for retail sale.
Figure 14:
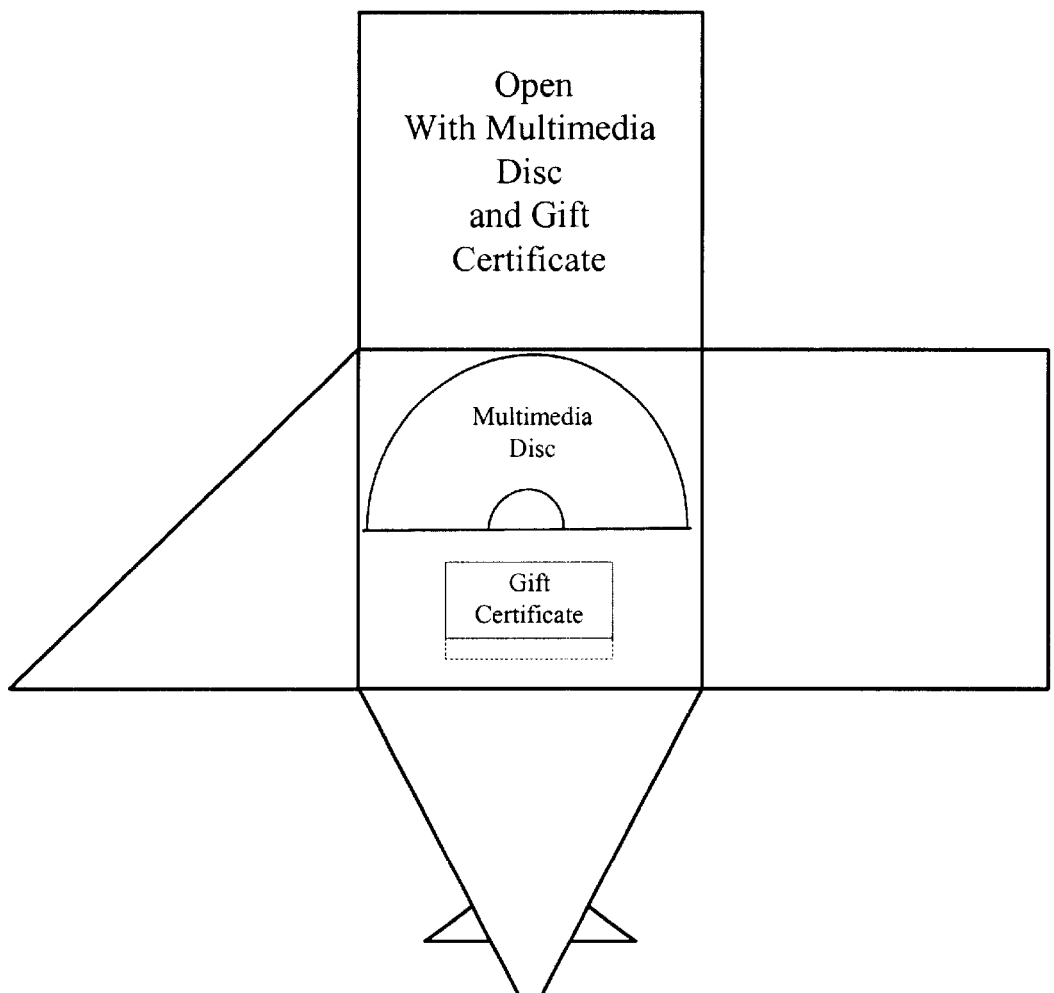
FIG. 14: Displays an example of a Multi-Fold card design that is open with a Multimedia Disc and a gift certificate.
Figure 14A:
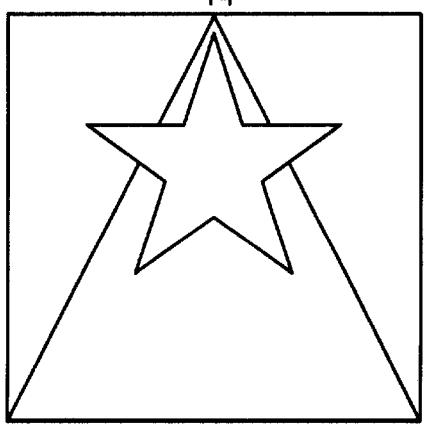
FIG. 14a: Displays an example of a Multi-Fold card design that is closed with a Multimedia Disc and a gift certificate.

For the purpose of describing this invention, the definition of provider will include, but not be limited to individual businesses, corporations, retail establishments, brokerage firms, universities, professionals and sales personnel that utilizes the Multimedia Gift Card for its intended use.

For the purpose of describing this invention, the definition of receiver is the person who receives the end product for personal use.

For the purpose of this invention, the definition of a Multimedia Disc will include, but not be limited to, any medium that can store digital data to include Compact Discs, Mini Compact Discs and DVD's.

The card exterior displays the artwork. The physical characteristics are individually designed to best support the overall card design and represent the provider. A bi-fold, tri-fold or multi-fold card of various shapes and sizes are used. Computer generated graphics are printed on heavy weight paper to medium weight cardboard. Every card is folded, die-cut and glued to receive, but not be limited to a multimedia disc, gift certificate, coupon or phone card. The gift certificate/coupon is placed in the card for easy accessibility and scanning by the retailer. The multimedia disc is placed in the card so that the label is in view. Both types of cards are available with an envelope that can be sent via mail or any other standard method of shipping.

The card displays professionally created artwork, logos, seasonal, special occasion and festive graphics that best portray the provider's intent for the overall multimedia card design. The artwork will vary for each application and can have a multitude of colors, designs and themes. All sides of the card can be used depending on the providers overall card and multimedia disc design.

The Multimedia Disc can include, but is not limited to: Seasonal and non-seasonal professionally recorded digital music, (to include, all varieties, types, and styles), multimedia presentations, video, product information, store locations, databases, printable coupons, catalogues, personal and corporate history information, web site links, university information and curriculums.

The multimedia disc label will be designed to match the artwork of the card and will include, but not be limited to, song titles, artist names, logos, and provider information. The personalized label will continually remind the receiver of the multimedia disc's origin, which will ultimately create a lasting tie to the provider.

What is claimed is:

1. A combined greeting card, gift certificate, and disc package assembly comprising; a single fold greeting card comprised of two panels attached by a single fold line, top or side opening, or a bi-fold greeting card comprised of three panels attached by two fold lines, top opening, side opening, or mid opening, said greeting card displaying indicia that may include one or more of professionally created artwork, text, logos, holiday graphics, seasonal graphics, special occasion graphics, and festive graphics; artwork that may vary for each application and have a multitude of colors, designs and themes; all sides of the card may display graphics and text predicated upon the overall card design; said greeting card constructed using materials of various size, composition, texture, and thickness that is cut, glued and folded to create slots, sleeves, pockets, tabs or holders to receive and hold an audio and computer readable storage medium to include compact disc and DVD; the material may be cut into various shapes and designs to enhance the exterior or interior of the card and allow for display mounting; an audio and computer readable storage medium with a printed, silk screened, or otherwise attached label that displays indicia that may include artwork, graphics, text, song titles, artist names, logos, and provider information that may compliment, enhance or match the overall design or theme of the card; the storage medium that is recorded in any language or format and may contain an assortment of professionally recorded seasonal or non-seasonal digital music to include all types, class, and styles; the storage medium that may also include a variety of digital data to include multimedia presentations, video presentations, company information, company history, store locations, databases, product information, printable coupons, university information, curriculums, retail catalogues, and web site links; the storage medium that can be played or viewed on any of a multitude of audio, video and computer apparatus; one or more additional slots, sleeves, pockets, tabs or holders to receive and hold one or more additional items to include one or more of the following: credit card, debit card, gift card, gift certificate, access key card, or phone card; the one or more additional cards placed in the one or more additional slots, sleeves, pockets, or holders, are constructed using materials to include plastic and paper of various size, composition, texture, and thickness which displays artwork, graphics, text, logos, and provider information that may compliment, enhance or match the overall design or theme of the card package; data provided and exchanged via data storage medium placed on the card to include a magnetic strip or other form of read write data medium, and bar codes; the one or more additional cards can be placed within the package assembly for easy access to the data stored on the card for purposes to include scanning the magnetic strip or bar code at point of sale; an optional envelope, wrapper, covering, or casing, either generic, matching the theme and design format of the card, or displaying unique artwork, text, logos, holiday graphics, seasonal graphics, special occasion graphics, and festive graphics that will provide security, protection, and or convenient mailing.

* * * * *